(12) United States Patent
Tortola

(10) Patent No.: US 7,175,536 B1
(45) Date of Patent: Feb. 13, 2007

(54) APPARATUS AND METHOD FOR INPUTTING COORDINATE INFORMATION TO A COMPUTING DEVICE

(75) Inventor: Angelo Tortola, Lexington, MA (US)

(73) Assignee: Venture Technologies, Inc., N. Billerica, MA (US)

(*) Notice: Subject to any disclaimer, the term of this patent is extended or adjusted under 35 U.S.C. 154(b) by 1448 days.

(21) Appl. No.: 09/866,530

(22) Filed: May 25, 2001

Related U.S. Application Data

(60) Provisional application No. 60/206,907, filed on May 25, 2000.

(51) Int. Cl.
*A63B 96/36* (2006.01)

(52) U.S. Cl. .................... 473/140; 473/146

(58) Field of Classification Search ............ 473/150, 473/151, 139–147, 149; 345/163, 156, 184; 434/251, 247, 252; 463/36, 37
See application file for complete search history.

(56) References Cited

U.S. PATENT DOCUMENTS

| 5,121,923 | A | * | 6/1992 | D'Allura ............... 473/140 |
| 5,178,393 | A | * | 1/1993 | Dennesen ............ 473/140 |
| 5,255,920 | A | * | 10/1993 | Mangeri ............. 473/140 |
| 5,454,561 | A | * | 10/1995 | Smith ............... 473/429 |
| 6,257,989 | B1 | * | 7/2001 | Tortola et al. ........ 473/140 |

* cited by examiner

*Primary Examiner*—John M. Hotaling, II
*Assistant Examiner*—Alex F. R. P. Rada
(74) *Attorney, Agent, or Firm*—Joseph Stecewycz

(57) ABSTRACT

An input device apparatus for providing coordinate data indicative of the motion of an object to a computing apparatus, includes an elongated member translatable along and rotatable about a longitudinal axis, a swing arm attached to the object and to the elongated member such that movement of the object results in corresponding movement of the elongated member, and an engagement surface for engaging an input device of the computing apparatus.

20 Claims, 7 Drawing Sheets

APPARATUS AND METHOD FOR INPUTTING COORDINATE INFORMATION TO A COMPUTING DEVICE

RELATED APPLICATION

The present Application is related to Provisional Patent Application filed 25 May 2000 and assigned Ser. No. 60/206,907, entitled "Novel PC Mouse."

FIELD OF THE INVENTION

This invention relates to an apparatus and method for inputting coordinate data to a computing device and, in particular, to a method for inputting such information via a stationary computer peripheral input device.

BACKGROUND OF THE INVENTION

There are many software applications which simulate sporting games. Virtual sporting games need a mechanism for inputting movement coordinates. It is therefore an object of the present invention to provide such a inputting mechanism.

BRIEF SUMMARY OF THE INVENTION

An input device apparatus for providing coordinate data indicative of the motion of an object to a computing apparatus, includes an elongated member translatable along and rotatable about a longitudinal axis, a swing arm attached to the object and to the elongated member such that movement of the object results in corresponding movement of the elongated member, and an engagement surface for engaging an input device of the computing apparatus.

DETAILED DESCRIPTION OF THE INVENTION

Figure 1:
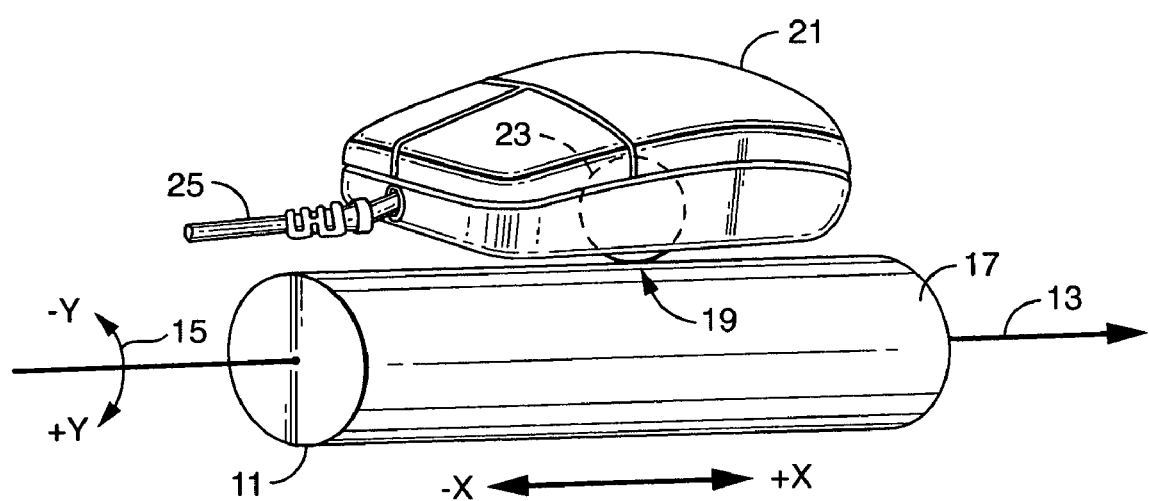
FIG. 1 is a perspective diagrammatical view of the basic elements of the present invention.

There is shown in FIG. 1 a perspective diagrammatical view of the basic elements of the present invention. An elongated member 11, here shown as a cylinder having a circular cross section, is supported such that movement along a longitudinal axis 13 (here represented by +X and –X directions) is allowed and rotation about the longitudinal axis 13 (here represented by +Y and –Y directions) is allowed, the rotation being indicated by an arrow 15. The elongated member 11 is further restrained such that off-axis movement of the elongated member 11, such as pitch and yaw, is prevented. Movement of the elongated member 11 along and about the longitudinal axis 13 is produced by a separate component mechanically coupled to the elongated member 11, as described in greater detail below.

A computer input peripheral device, such as a mouse 21, is positioned against the elongated member 11 such that the internal tracking device, a rotatable ball 23 retained in the mouse 21 for example, is otherwise stationary and held against an engagement surface 17 of the elongated member 11 at a point of contact 19. It can be appreciated by one skilled in the relevant art that movement of the elongated member 11 along and about the longitudinal axis 13 results in corresponding movement of the engagement surface 17 against the stationary rotatable ball 23. This produces rotation of the rotatable ball 23 in a manner similar to that of moving the mouse 21 across a surface, such as a mouse pad (not shown). Accordingly, data indicative of the movement of the elongated member 11 along and about the longitudinal axis 13 (e.g., positional and motion coordinates) can be input to a digital system, such as a computer (not shown), via a signal output wire 25 in the same method as data indicative of the mouse 21 moving across a surface is conventionally input to a computer mouse port. As appreciated by one skilled in the relevant art, the data transmitted over the signal output wire is produced by an electronic microprocessor (not shown) in the mouse 21.

Figure 2:
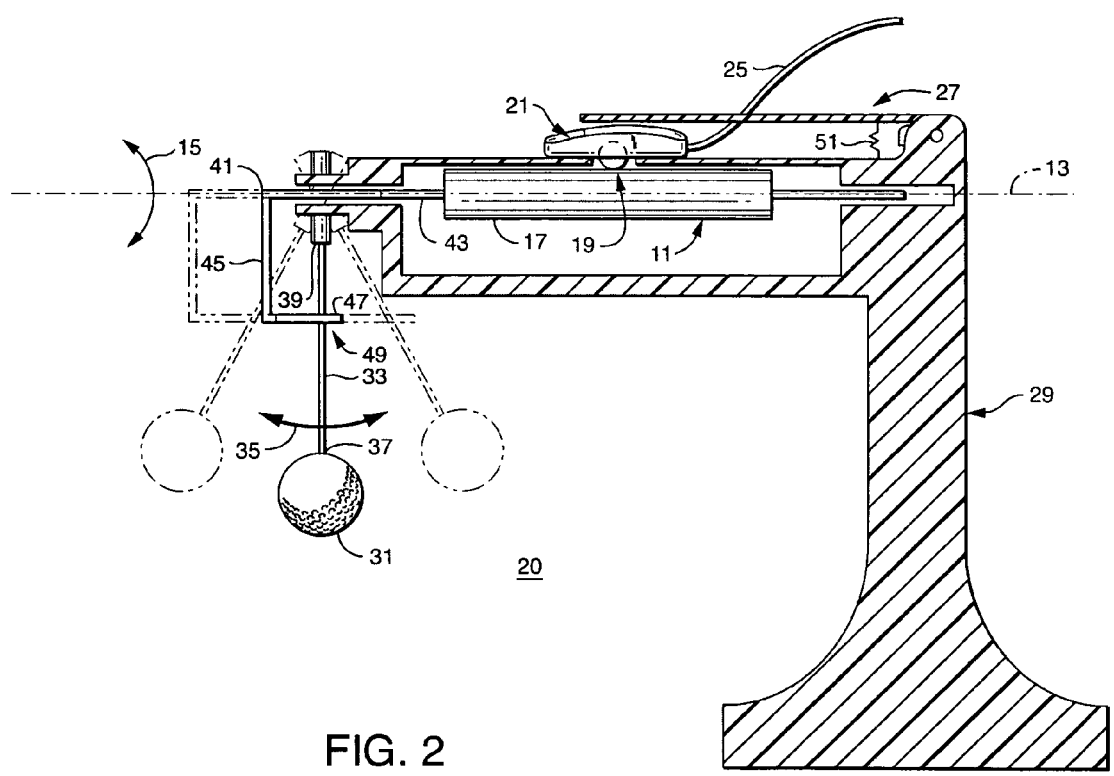
FIG. 2 is a preferred embodiment of the present invention.

In a preferred embodiment, motion of an object 31 is coupled to the elongated member 11 as shown in FIG. 2. In the illustration provided, the object 31 is configured as a golf ball, and forms part of a putting system 20. Generally, the object 31 is configured as a spherical item used in a competitive sport, such as a baseball, a golf ball, or a soccer ball. The object 31 is attached to a distal end 37 of a swing arm 33 which, in turn, is mechanically coupled to the elongated member 11 at a proximal end 39. The coupling between the swing arm 33 and the elongated member 11 is such that, when the swing arm 33 rotates about the longitudinal axis 13 (i.e., moves into and out of the plane of the Figure), the elongated member 11 likewise rotates about the longitudinal axis 13. The coupling between the swing arm 33 and the elongated member 11 is additionally such that, when the when the swing arm 33 rotates in a plane containing the longitudinal axis 13 (i.e., moves in the +Z and –Z directions indicated by the arrow 35), the elongated member 11 moves in the +X and –X directions, along the longitudinal axis 13.

In a preferred embodiment, the mechanical coupling between the swing arm 33 and the elongated member 11 is achieved by means of a pivoting element 41 comprising a first arm 43, a cross piece 45, and a second arm 47. The first arm 43 is substantially parallel with the longitudinal axis 13 and is attached to the elongated member 11 such that axial translation of the first arm 43 (i.e., in the +X and –X directions) results in the same axial translation of the elongated member 11. In the configuration shown, the first arm 43 is rotatable about the longitudinal axis 13.

In a preferred embodiment, the second arm 47 is substantially parallel to the first arm 43. The second arm 47 is connected to the swing arm 33 at a pivot point 49 such that the swing arm 33 is free to rotate in the +Z and –Z directions while being coupled to the second arm 47, as described in greater detail below. Translation of the second arm 47 in the +X and –X directions results in corresponding movement of the elongated member 11 along the longitudinal axis 13.

The crosspiece 45 provides a rigid connection between the first arm 43 and the second arm 47 such that movement of the second arm 47 in the +X and –X directions results in equivalent movement of the first arm 43 along the longitudinal axis 13. Additionally, when the swing arm 33 rotates about the longitudinal axis 13, the second arm 47 moves in a circular path having a center of rotation on the longitudinal axis 13.

The elongated member 11 is secured to a stationary bracket 29 which provides for appropriate placement of the object 31. For example, if the object 31 is intended to simulate a golf ball, the length of the swing arm 33 and the height of the bracket 29 are specified such that the height of the object 31 above the ground corresponds to the height of a golf tee. A holder arm 27 is pivotally connected to the bracket 29 so as to allow installation of the mouse 21 so that the rotatable ball 23 is held against the elongated member 11 at the point of contact 19. A tension spring 51 provides a compression force for retaining the mouse 21 between the holder arm 27 and the bracket 29.

A typical application of the putting system 20 allows a person with a golf club to practice putting or driving swings by hitting the object and viewing the results on an electronic display (not shown), such as a computer screen for example. When struck with the golf club, the object 31 is caused to spin about the longitudinal axis 13 in the +Y or the −Y direction, depending on whether the person is right- or left-handed. This motion is imparted to the elongated member 11 as a rotation about the longitudinal axis 13. If the object 31 is not struck 'head on,' the swing arm 33 will also swing in the +Z or −Z direction. This swinging is imparted to the elongated member 11 as a movement in the +X or the −X direction. Thus, by using the signals provided by the mouse 21 when the object is caused to move, the motion of the object can be simulated on the electronic display attached to the signal output wire 25, as described in greater detail below.

Figure 3:
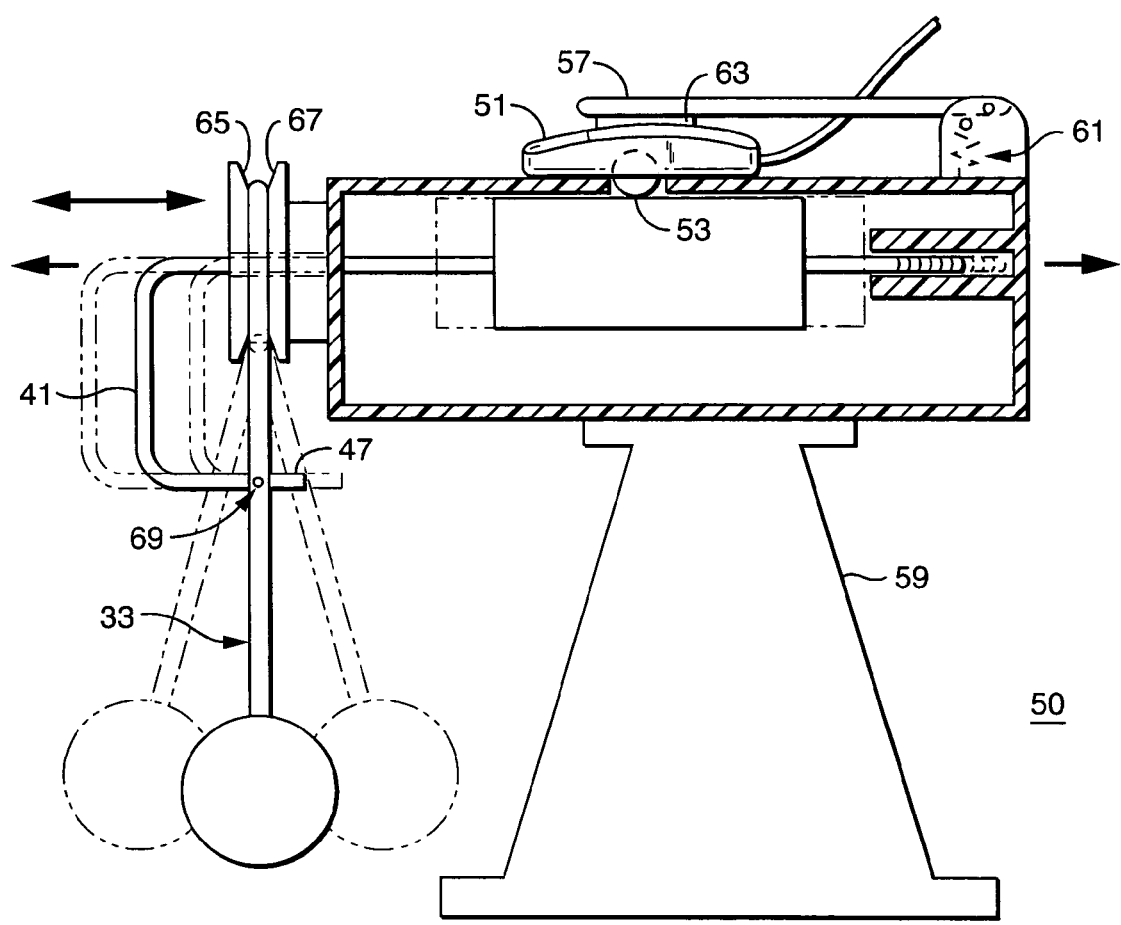
FIG. 3 is a more detailed view of the apparatus of FIG. 2 showing a pivot point.

There is shown in FIG. 3 an alternative embodiment of a putting system 50. The putting system 50 includes a mouse holder arm 57 pivotally attached to a stationary bracket 59. A piece of elastomeric material 63 is attached to the mouse holder arm 57 such that a cushion is provided when the mouse holder arm 57 is retained against the mouse 51 by a ratchet mechanism 61. Release of the ratchet mechanism 61 allows the mouse holder arm 57 to spring away from the bracket 59 and the mouse 51 to be removed.

Figure 4:
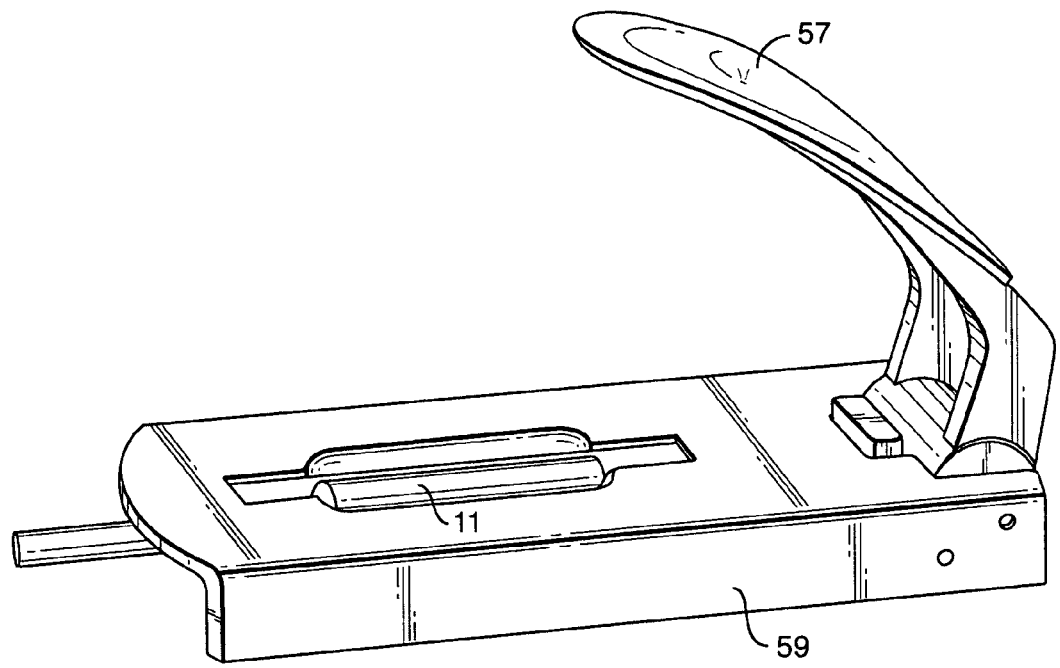
FIG. 4 is a perspective view of the bracket and a mouse holder arm in an open position.
Figure 5:
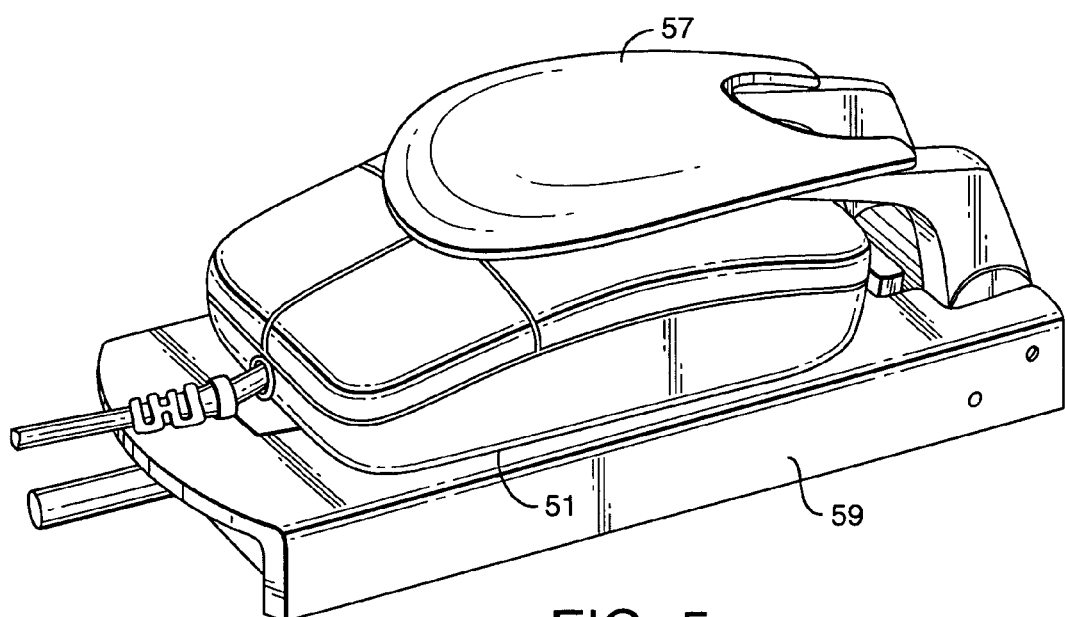
FIG. 5 is a view of the bracket and mouse holder arm of FIG. 4 in a closed position.

The swing arm 33 is coupled to the second arm 47 of the pivoting element 41 by means of a pin 69 passing through the swing arm 33 and the second arm 47. Movement of the swing arm in the +Z and the −Z directions may be restricted by guide surfaces 65 and 67. FIG. 4 shows the mouse holder arm 57 in a raised position, and also shows the position of the elongated member 11 in the bracket 59. When the mouse holder arm 57 is closed, as shown in FIG. 5, the mouse 51 is retained against the bracket 59, as described above.

Figure 6:
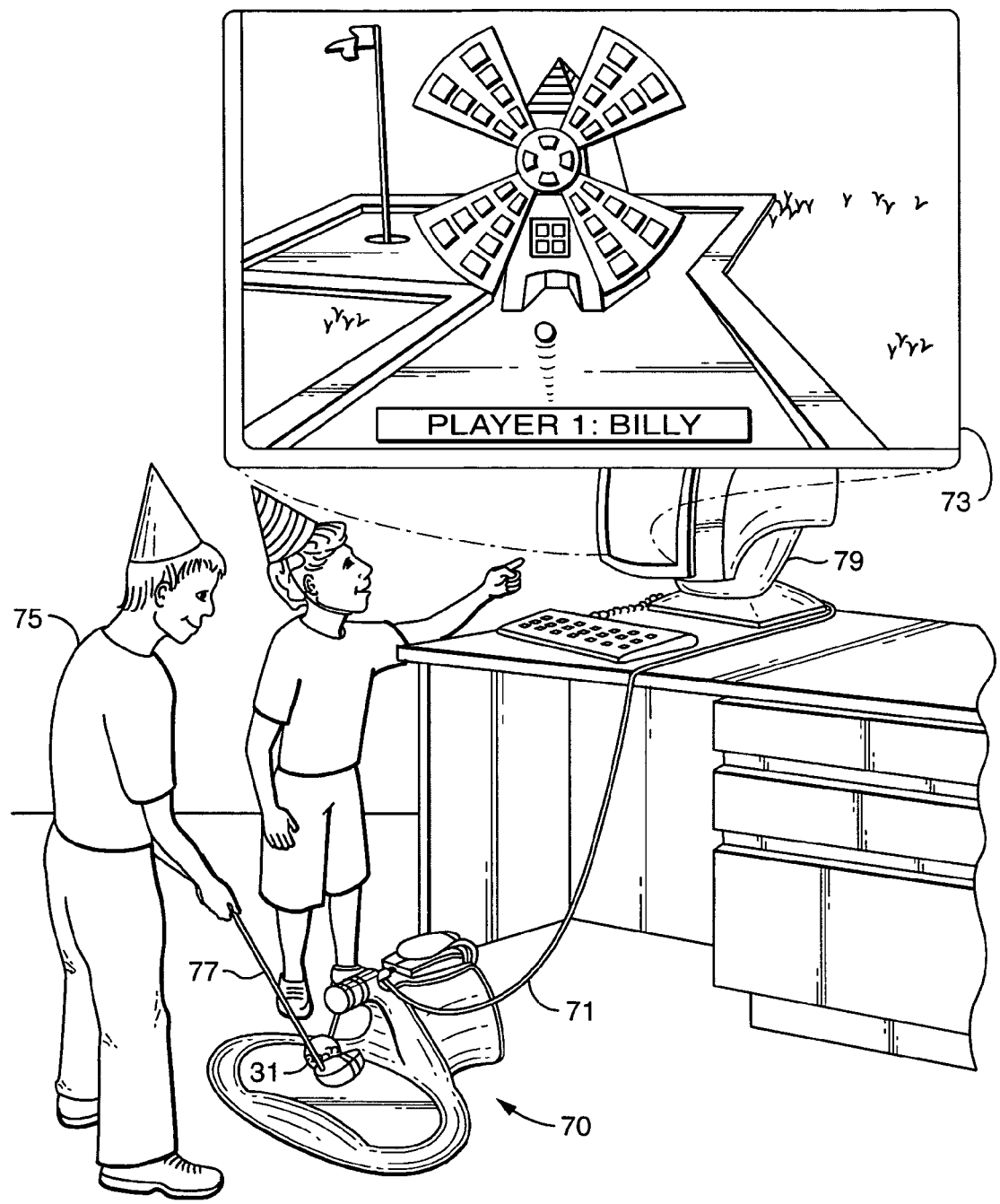
FIG. 6 shows an application of the embodiment of FIG. 2 as a putting station.

FIG. 6 shows a player 75 using a putting system 70 for an entertainment application. The player 75 uses a golf club 77 to strike the object 31 which moves in response as described above. In response, the putting system 70 transmits signals to a personal computer 79 along a signal output line 71. The personal computer 79 includes software to process the signals and produces a display 73 simulating the motion of a golf ball along a miniature green. Additional software may provide for scoring, sound effects, multiple players, and other features known to one skilled in the relevant art.

Figure 7:
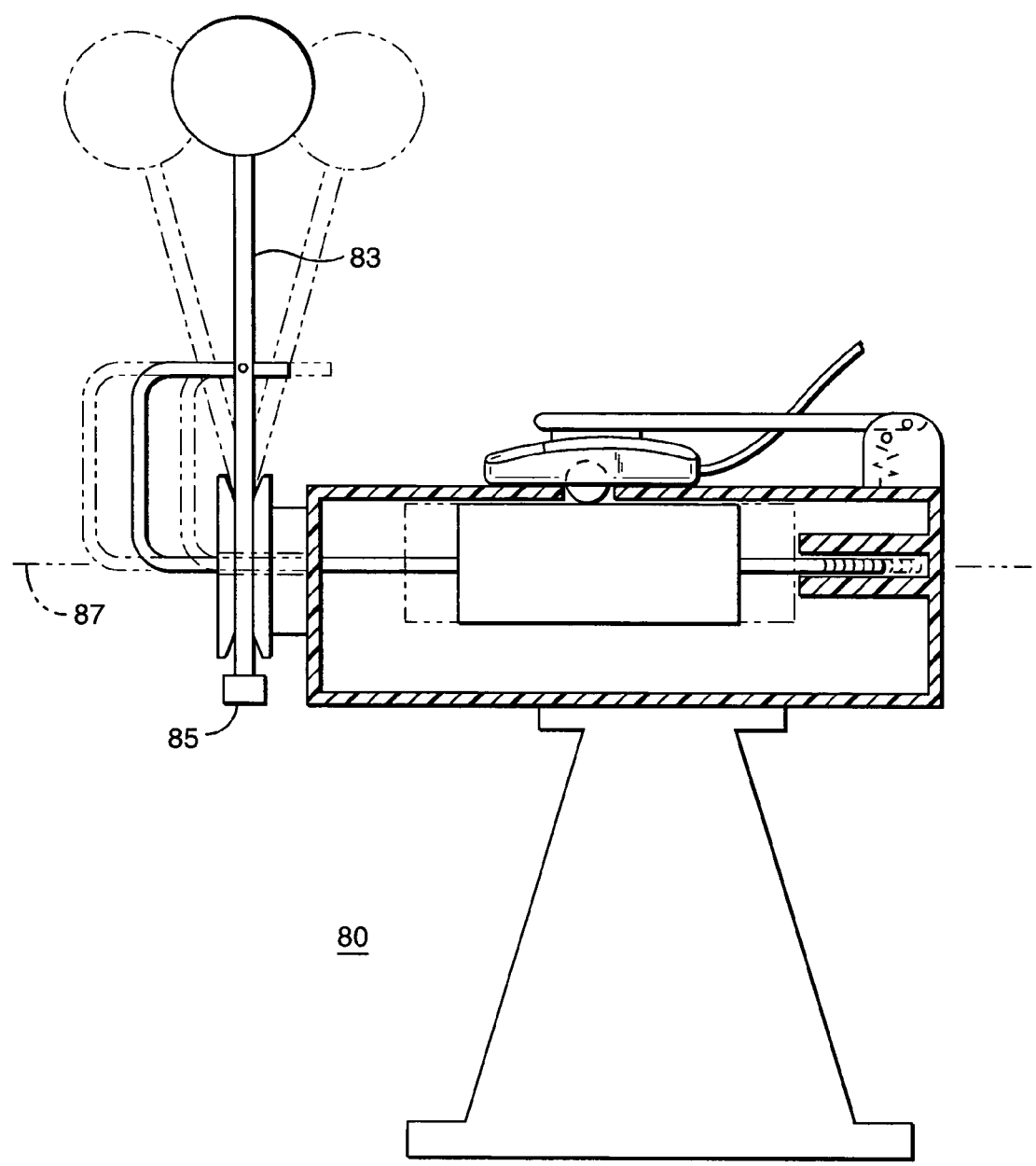
FIG. 7 shows an alternative embodiment of the apparatus of FIG. 2.
Figure 8:
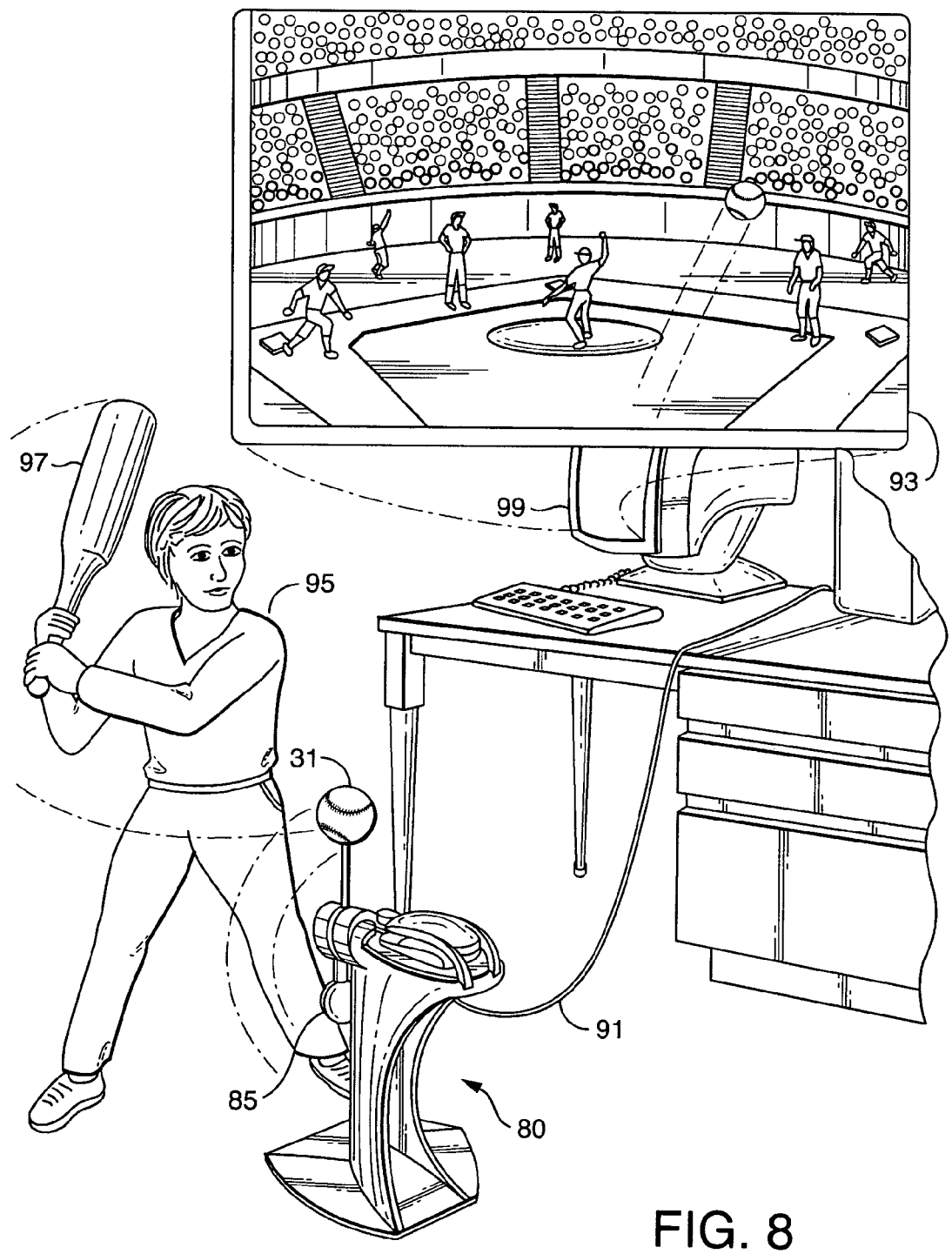
FIG. 8 shows an application of the embodiment of FIG. 7 as a tee ball station.

FIG. 7 illustrates an alternative embodiment of the inventive apparatus. A batting system 80 includes a counterweight 85 attached to a swing arm 83 such that the swing arm 33 is normally oriented with the object 31 in a raised position rather than suspended as in the above-described embodiments. This configuration allows use of a baseball, or a tee ball, as shown in FIG. 8. A player 95 uses a bat 97 to strike the object 31, here shown as a baseball. The counterweight 85 serves to maintain the object 31 at a 'batting' height. When the object 81 is struck, the electronic microprocessor in the mouse transmits data signals to a personal computer 99 which produces a display 93 for viewing by the player 95.

In yet another alternative embodiment, the output of the electronic microprocessor in the mouse 51 is reprogrammed so as to provide data signals to handheld electronic devices, such as an electronic game with a display screen. In still another embodiment, only the electronic microprocessor of the mouse is used to produce data signals.

Alternatively, the swing arm 83 can be positioned such that a longitudinal axis 87 is vertical. In such a configuration (not shown), a soccer ball can be used in place of the object 81, where the player kicks the soccer ball horizontally to effect action in the game.

While the invention has been described with reference to a preferred embodiment, it will be understood by those skilled in the relevant art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for providing, to a digital system, data indicative of the motion of an object, said apparatus comprising:
    an elongated member translatable in an axial direction along a longitudinal axis thereof and rotatable in a circumferential direction about said longitudinal axis;
    a swing arm having a distal section for attachment to the object and a proximal section coupled to said elongated member such that movement of the object results in corresponding movement of said elongated member; and
    an engagement surface for engaging an input device of the digital system, said engagement surface being attached to said elongated member such that movement of said elongated member results in corresponding movement of said engagement surface
such that, when said input device is placed in contact with said engagement surface, movement of said engagement surface is conveyed to the digital system via said input device.

2. The apparatus of claim 1 wherein said elongated member comprises a cylinder.

3. The apparatus of claim 2 wherein said cylinder has a circular cross section.

4. The apparatus of claim 1 wherein said elongated member comprises a prism.

5. The apparatus of claim 1 wherein said engagement surface is textured to frictionally engage a tracking ball.

6. The apparatus of claim 1 wherein said engagement surface includes a plurality of reflective regions for optically engaging an optical input device.

7. The apparatus of claim 6 wherein said apparatus further comprises a computer input peripheral device, said computer input peripheral device including said optical input device and an electronic microprocessor, said electronic microprocessor for inputting to the digital system data indicative of the movement of said elongated member.

8. The apparatus of claim 7 wherein said computer input peripheral device comprises a computer mouse.

9. The apparatus of claim 1 wherein said engagement surface includes a plurality of magnetic regions for magnetically engaging a magnetic input device.

10. The apparatus of claim 9 wherein said apparatus further comprises a computer input peripheral device, said computer input peripheral device including said magnetic input device and a signal output wire, said signal output wire for inputting to the digital system data indicative of the movement of said elongated member.

11. The apparatus of claim 1 wherein said engagement surface comprises a surface of said elongated member.

12. The apparatus of claim 1 further comprising an axial element coupled to said proximal section of said swing arm, said axial element being attached to said elongated member such that motion of said swing arm in a first direction results in corresponding motion of said elongated member in said circumferential direction.

13. The apparatus of claim 1 further comprising a pivoting element coupled to said proximal section of said swing arm and pivotably coupled to said elongated element such that motion of said swing arm in a second direction results in corresponding motion of said elongated member in said axial direction.

14. The apparatus of claim 13 wherein said pivoting element comprises a bracket having:
 a first arm substantially parallel with said longitudinal axis and attached to said elongated member such that axial translation of said first arm results in axial translation of said elongated member;
 a second arm substantially parallel to said first arm, said second arm being connected to said swing arm such that movement of said swing arm in said second direction results in axial translation of said second arm; and
 a crosspiece connecting said first arm and said second arm such that axial translation of said second arm results in axial translation of said first arm.

15. The apparatus of claim 1 wherein the object comprises a member of the group consisting of a baseball, a golf ball, and a soccer ball.

16. A method for providing, to a digital system, data indicative of the motion of an object, said method comprising the steps of:
 positioning a computer peripheral input device against an elongated member, said elongated member translatable in an axial direction along a longitudinal axis thereof and rotatable in a circumferential direction about said longitudinal axis;
 providing a swing arm having a distal section for attachment to the object and a proximal section coupled to said elongated member such that movement of the object results in corresponding movement of said elongated member; and
 providing an engagement surface on said elongated member, said engagement surface for engaging an input device of the digital system, said engagement surface attached to said elongated member such that movement of said elongated member results in corresponding movement of said engagement surface.

17. The method of claim 16 wherein said computer input peripheral device comprises a member of the group consisting of a tracking ball, an optical input device, and a magnetic input device.

18. The method of claim 17 wherein said engagement surface comprises a plurality of reflective regions for optically engaging said optical input device.

19. The method of claim 17 wherein said engagement surface comprises a plurality of magnetic regions for magnetically engaging said magnetic input device.

20. The method of claim 16 further comprising the step of providing data to the digital system, said data indicative of the movement of said elongated member.

* * * * *